(12) United States Patent
Liu et al.

(10) Patent No.: US 7,185,814 B2
(45) Date of Patent: Mar. 6, 2007

(54) LAYER STRUCTURE AND METHOD OF MANUFACTURE FOR OPTICAL MEMORY STRIP (OMS)

(75) Inventors: Jeffrey Liu, San Jose, CA (US); Francis K. King, San Jose, CA (US)

(73) Assignee: Dcard, Inc., Milpitas, CA (US)

( * ) Notice: Subject to any disclaimer, the term of this patent is extended or adjusted under 35 U.S.C. 154(b) by 139 days.

(21) Appl. No.: 10/779,961

(22) Filed: Feb. 17, 2004

(65) Prior Publication Data

US 2004/0159707 A1   Aug. 19, 2004

Related U.S. Application Data

(63) Continuation-in-part of application No. 10/424,341, filed on Apr. 28, 2003.

(60) Provisional application No. 60/419,293, filed on Oct. 16, 2002.

(51) Int. Cl.
G06K 7/10 (2006.01)
G06K 7/14 (2006.01)
G06K 19/00 (2006.01)
G06K 5/00 (2006.01)
G11B 7/20 (2006.01)

(52) U.S. Cl. ............ 235/454; 235/487; 235/380; 369/97; 428/64.4

(58) Field of Classification Search ............ 235/454, 235/380, 487; 369/96, 15, 275.1, 275.3, 369/275.4, 277, 273; 720/745; 360/2, 88
See application file for complete search history.

(56) References Cited

U.S. PATENT DOCUMENTS

| | | | | |
|---|---|---|---|---|
| 3,871,119 A * | 3/1975 | Mayer | | 430/10 |
| 4,807,220 A * | 2/1989 | Miyai et al. | | 339/286 |
| 4,865,949 A * | 9/1989 | Yamamuro et al. | | 430/270.18 |
| 4,868,373 A * | 9/1989 | Opheij et al. | | 235/380 |
| 4,972,402 A * | 11/1990 | Miura et al. | | 369/275.1 |
| 5,045,676 A * | 9/1991 | Kime | | 235/487 |
| 5,059,774 A * | 10/1991 | Kubo et al. | | 235/454 |
| 5,248,584 A * | 9/1993 | Miura et al. | | 430/270.18 |
| 5,274,617 A * | 12/1993 | Terashima et al. | | 369/53.24 |
| 5,591,501 A * | 1/1997 | Ovshinsky et al. | | 428/64.1 |
| 5,696,368 A * | 12/1997 | Noda et al. | | 235/454 |
| 5,744,792 A * | 4/1998 | Imataki et al. | | 235/492 |
| 5,748,600 A * | 5/1998 | Sugano et al. | | 369/44.18 |
| 5,763,868 A * | 6/1998 | Kubota et al. | | 235/487 |
| 5,777,307 A * | 7/1998 | Yamazaki | | 235/454 |
| 5,895,909 A * | 4/1999 | Yoshida | | 235/487 |
| 5,942,744 A * | 8/1999 | Kamo et al. | | 235/487 |
| 5,985,400 A * | 11/1999 | Hennessey | | 428/64.1 |
| 6,016,298 A * | 1/2000 | Fischer | | 720/745 |
| 6,088,319 A * | 7/2000 | Gudesen | | 369/97 |
| 6,277,461 B1 * | 8/2001 | Naganuma et al. | | 428/64.1 |

(Continued)

Primary Examiner—Daniel Walsh
(74) Attorney, Agent, or Firm—Bo-In Lin

(57) ABSTRACT

This invention discloses an optical memory strip and a data card that has at least an optical memory strip as a cutoff piece bonding and attaching to the data card for storing data accessible with an optical read/write head. The data card can further includes at least a magnetic data track for storing data accessible with a magnetic data read/write head. In another data card of this invention, it further includes a semiconductor data storage card for storing data that is accessible by using a semiconductor chip data read/write device.

75 Claims, 19 Drawing Sheets

U.S. PATENT DOCUMENTS

| | | | |
|---|---|---|---|
| 6,280,809 B1* | 8/2001 | Wang et al. ................ 428/64.1 |
| 6,454,915 B1* | 9/2002 | Shiratori et al. ......... 204/192.2 |
| 6,502,755 B2* | 1/2003 | Liu et al. .................... 235/489 |
| 6,542,444 B1* | 4/2003 | Rutsche ....................... 369/14 |
| 6,550,678 B1* | 4/2003 | Ong et al. .................. 235/454 |
| 6,597,653 B1* | 7/2003 | Burnett ....................... 369/273 |
| 6,791,937 B2* | 9/2004 | Tosaki et al. ............ 369/275.3 |
| 6,814,286 B2* | 11/2004 | Cheung ...................... 235/440 |
| 6,874,158 B2* | 3/2005 | Chan et al. ................ 720/720 |
| 6,887,547 B2* | 5/2005 | Nishikiori et al. ......... 428/64.1 |
| 6,934,098 B2* | 8/2005 | King et al. .................... 360/2 |
| 2001/0038588 A1* | 11/2001 | Nagatomo et al. ....... 369/53.22 |
| 2001/0046613 A1* | 11/2001 | Hosokawa ........... 428/694 ML |
| 2002/0034155 A1* | 3/2002 | Usami ....................... 369/286 |
| 2002/0136124 A1* | 9/2002 | Pirot et al. ............... 369/47.54 |
| 2002/0153421 A1* | 10/2002 | Haddock .................... 235/454 |
| 2003/0039191 A1* | 2/2003 | Arioka et al. ............ 369/59.11 |
| 2003/0108708 A1* | 6/2003 | Anderson et al. ......... 428/64.4 |
| 2003/0136846 A1* | 7/2003 | Higgins et al. ............. 235/487 |
| 2004/0041711 A1* | 3/2004 | Loewidt ................ 340/825.52 |
| 2004/0050939 A1* | 3/2004 | Mathias et al. ............. 235/487 |
| 2004/0071711 A1* | 4/2004 | Bicknell et al. ......... 424/178.1 |
| 2004/0208089 A1* | 10/2004 | Shen ....................... 369/39.01 |
| 2005/0169117 A1* | 8/2005 | Umada et al. ........... 369/13.35 |
| 2006/0028973 A1* | 2/2006 | Shoji et al. .............. 369/275.1 |

\* cited by examiner

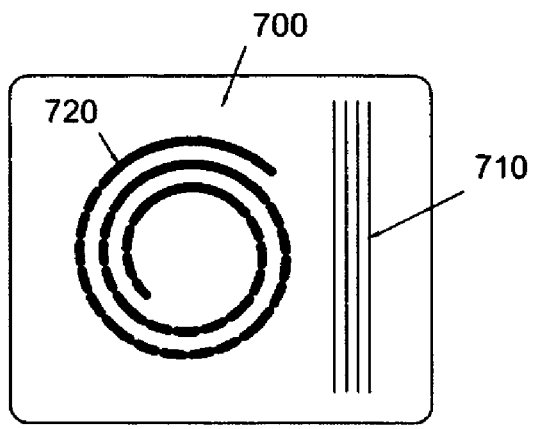
Fig. 1A
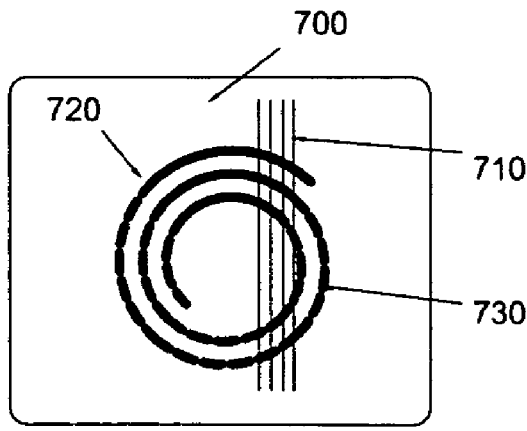
Fig. 1B
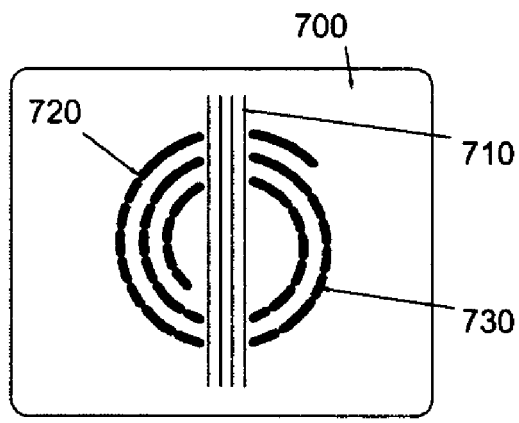
Fig. 1C
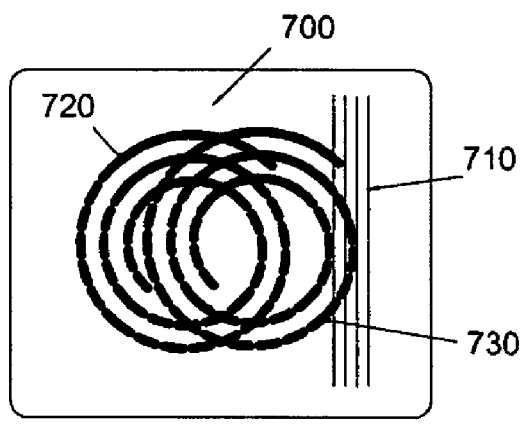
Fig. 1D
Fig. 1A to 1D

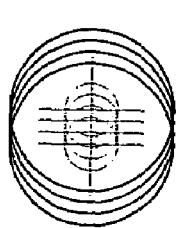
Fig. 1E-1
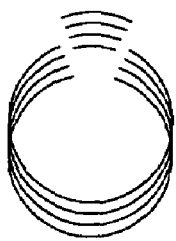
Fig. 1E-2
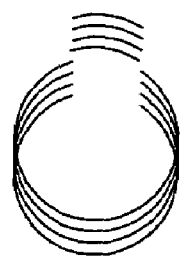
Fig. 1E-3
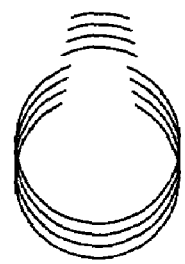
Fig. 1E-4
Fig. 1E-5
Fig. 1E-6
Fig. 1E-7
Fig. 1E-8
Fig. 1E-9
Fig. 1E-10
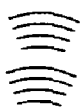
Fig. 1E-11
Fig. 1E-12
Fig. 1E-13
Fig. 1E-14
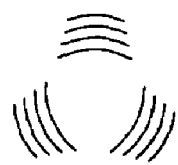
Fig. 1E-15
Fig. 1E-16
Fig. 1E-17
Fig. 1E-18
Fig. 1E-19
Fig. 1E-20
Fig. 1E

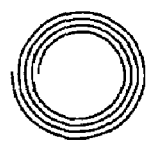 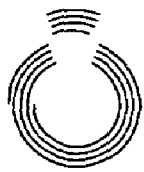 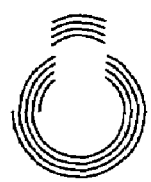 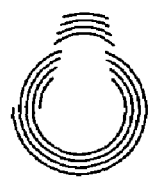 
Fig. 1F-1  Fig. 1F-2  Fig. 1F-3  Fig. 1F-4  Fig. 1F-5
    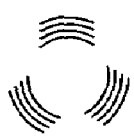
Fig. 1F-6  Fig. 1F-7  Fig. 1F-8  Fig. 1F-9  Fig. 1F-10
    
Fig. 1F-11  Fig. 1F-12  Fig. 1F-13  Fig. 1F-14  Fig. 1F-15
    
Fig. 1F-16  Fig. 1F-17  Fig. 1F-18  Fig. 1F-19  Fig. 1F-20
Fig. 1F

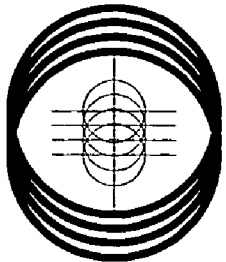 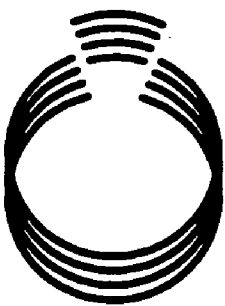 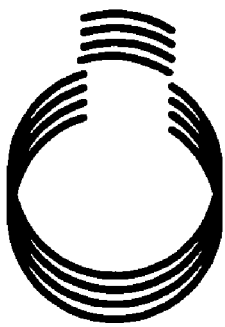 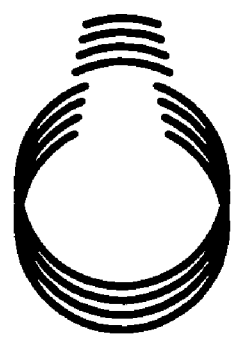
Fig. 1G-1     Fig. 1G-2     Fig. 1G-3     Fig. 1G-4
   
Fig. 1G-5     Fig. 1G-6     Fig. 1G-7     Fig. 1G-8
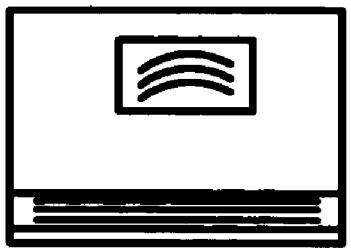 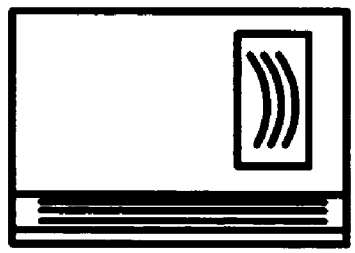 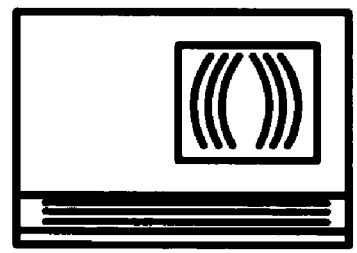
Fig. 1G-9     Fig. 1G-10     Fig. 1G-11
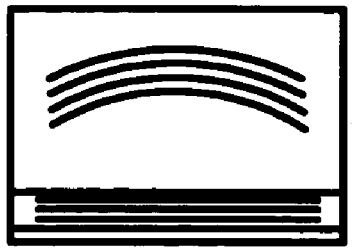 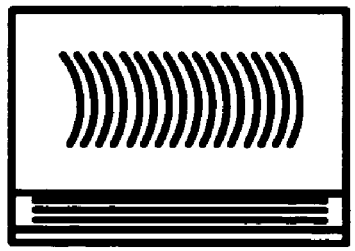 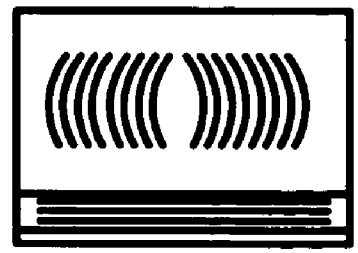
Fig. 1G-12     Fig. 1G-13     Fig. 1G-14
Fig. 1G

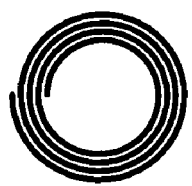
Fig. 1H-1
Fig. 1H-2
Fig. 1H-3
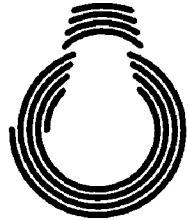
Fig. 1H-4
Fig. 1H-5
Fig. 1H-6
Fig. 1H-7
Fig. 1H-8
Fig. 1H-9
Fig. 1H-10
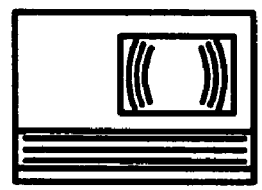
Fig. 1H-11
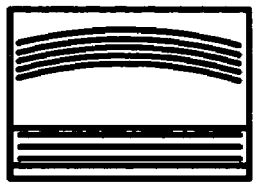
Fig. 1H-12
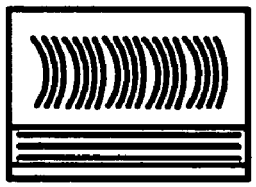
Fig. 1H-13
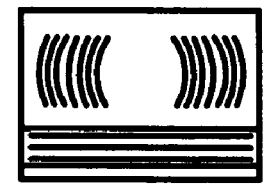
Fig. 1H-14
Fig. 1H

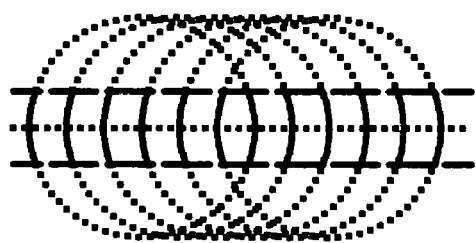
Fig. 1I-1
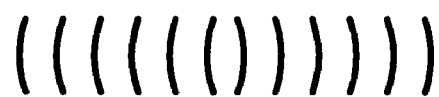
Fig. 1I-4
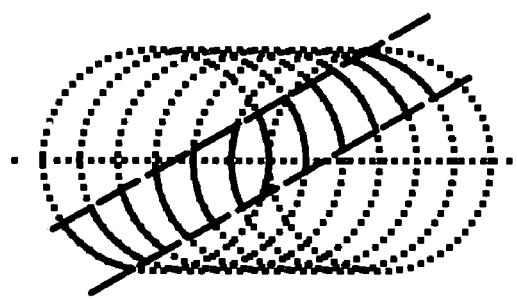
Fig. 1I-2
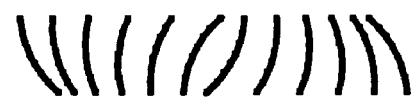
Fig. 1I-5
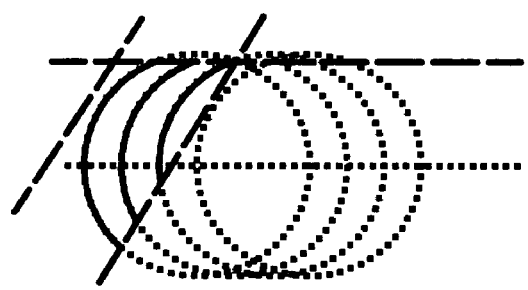
Fig. 1I-3
Fig. 1I-6
Fig. 1I

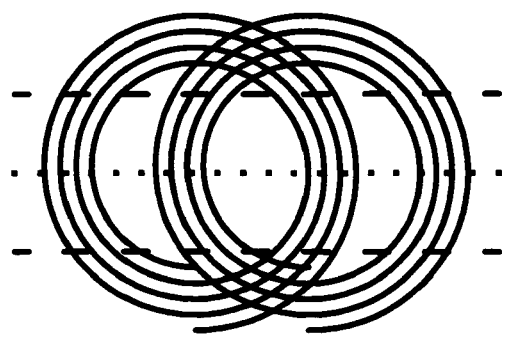
Fig. 1J-1
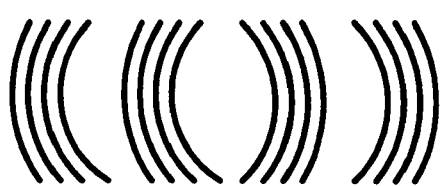
Fig. 1J-4
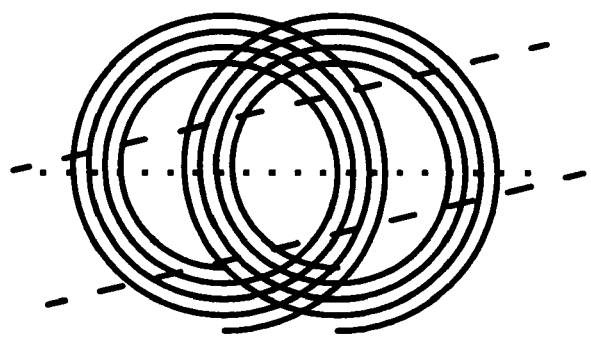
Fig. 1J-2
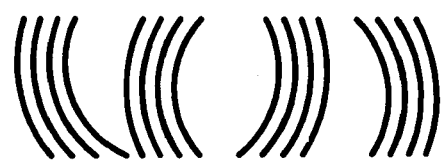
Fig. 1J-5
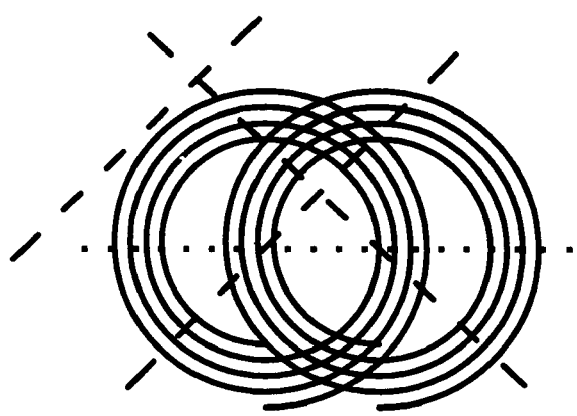
Fig. 1J-3
Fig. 1J-6
Fig. 1J

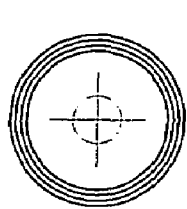 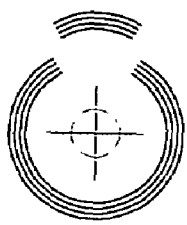 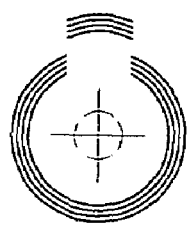 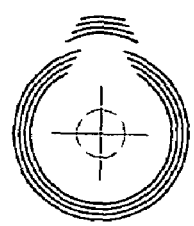 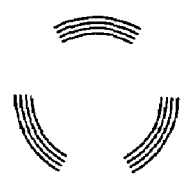
Fig. 1K-1    Fig. 1K-2    Fig. 1K-3    Fig. 1K-4    Fig. 1K-5
    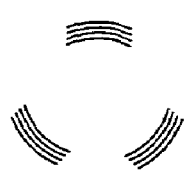
Fig. 1K-6    Fig. 1K-7    Fig. 1K-8    Fig. 1K-9    Fig. 1K-10
    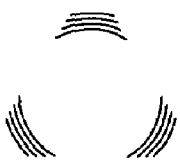
Fig. 1K-11    Fig. 1K-12    Fig. 1K-13    Fig. 1K-14    Fig. 1K-15
    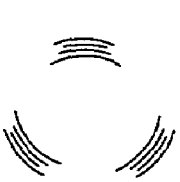
Fig. 1K-16    Fig. 1K-17    Fig. 1K-18    Fig. 1K-19    Fig. 1K-20
Fig. 1K

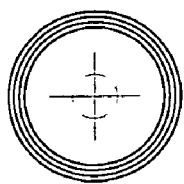 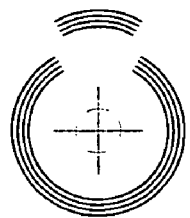 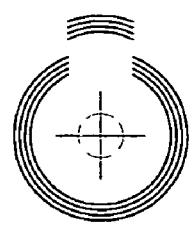 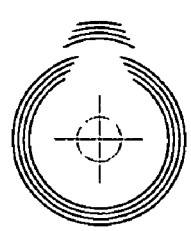
Fig. 1L-1     Fig. 1L-2     Fig. 1L-3     Fig. 1L-4
   
Fig. 1L-5     Fig. 1L-6     Fig. 1L-7     Fig. 1L-8
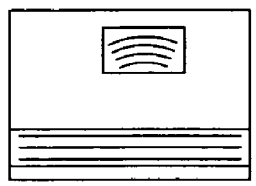 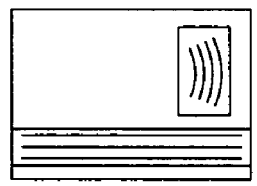 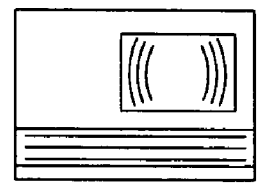
Fig. 1L-9     Fig. 1L-10     Fig. 1L-11
 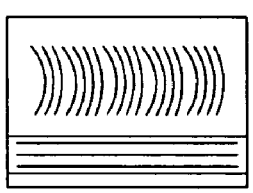 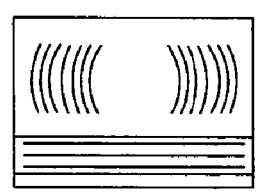
Fig. 1L-12     Fig. 1L-13     Fig. 1L-14
Fig. 1L

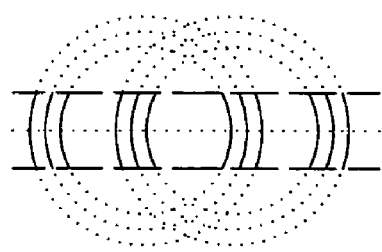
Fig. 1M-1
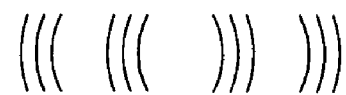
Fig. 1M-4
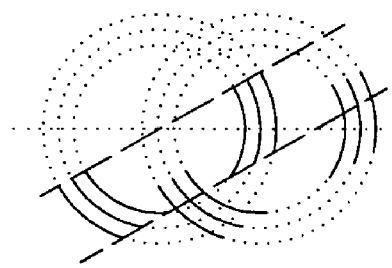
Fig. 1M-2
Fig. 1M-5
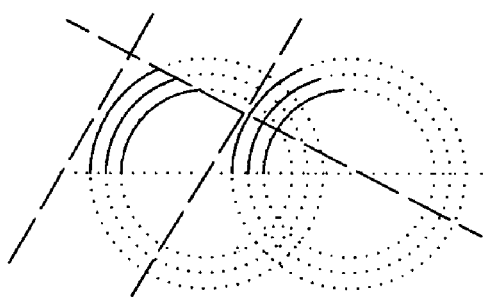
Fig. 1M-3
Fig. 1M-6
Fig. 1M Layer Structure of OMS

LAYER STRUCTURE AND METHOD OF MANUFACTURE FOR OPTICAL MEMORY STRIP (OMS)

This Application is a Continuation-in-Part Application (CIP) of a previously filed application Ser. No. 10/424,341 filed on Apr. 28, 2003, and the application Ser. No. 10/424,341 is a continuation-in-Part (CIP) Application of a Provisional Application No. 60/419,293 filed on Oct. 16, 2002. The Provisional Application No. 60/419,293 is a Continuation-in-Part Application (CIP) of a previously filed Provisional Application No. 60/081,257 filed on Apr. 9, 1998 and a Formal application Ser. No. 09/289,427 filed on Apr. 9, 1999, by one of a common inventors of this Patent Application.

BACKGROUND OF THE INVENTION

1. Field of the Invention

This invention relates generally to systems and method for reading data from and writing data to data storage medium by employing the magnetic and optical recording technologies. More particularly, this invention is related to a data card provided with at least an optical memory strip (OMS) that includes a recording layer having a plurality of data tracks where the recording layer is totally sealed and bonded between an upper layer and lower layer to form as part of the OMS strip.

2. Description of the Prior Art

Conventional techniques of accessing data stored on data storage media, particularly on data cards provided with magnetic strip or "Smart Card", are limited by the amount of data that can be stored in such storage media. Furthermore, the conventional techniques for providing data strips for storing personal data are further limited by the difficulties that the magnetic strip is often damaged by scratched surface and the optical strip if not formed on the back of a plastic card to extend over the entire length over the whole surface of the card often become peeled off due to a lack of sufficient bonding strength to the card. Such difficulties cause problem of reliability in using the card for ID or security verification and authentication by storing data on the back of the credit card or ID card.

The technologies of accessing data stored in data storage media commonly available are limited to either reading/writing data on a data strips, e.g., magnetic data strip(s) on the back of a credit card or identification card, on circular data tracks, e.g., a flopping diskette, or data stored in semiconductor chips, e.g., Smart-card chip. Limited by these data storage configurations, the amount of data that can be stored in the credit cards are quite limited. For the purpose of preventing credit card fraud or identification theft, it is often necessary to provide card owner's biometrics data on the cards such as the thumbprints, DNA, iris or picture of the true card owner. However, some of the Smart-card chips and magnetic strips as now commonly utilized in a credit card store sampled thumbprints (not a true copy) yet still do not have sufficient capacity to store pictures and more detailed biometrics data. Furthermore, the conventional credit card readers when reading the magnetic strips generally do not have the capabilities to process the data to display the picture in order to identify the true owner of a credit card. For these reasons, despite the advancements now made in the technologies of data storage and data processing, the effectiveness of preventing identification thefts and credit card frauds is still limited by these technical difficulties. Even that the "Smart Card" chip implemented as semiconductor storage chip added to the credit cards or identification cards for the purpose of storing more data but such "Smart Card" chips are much more expensive than the magnetic strips as now commonly implemented and the Smart-card chips still do not provide sufficient storage capacities for effective fault prevention.

Drexler disclosed in several patented inventions different data storage media to overcome these limitations. In U.S. Pat. No. 4,609,812 entitled "Prerecorded strip data storage card", Drexler discloses a data storage card with spaced apart data strips. The card is wallet-size and preferably the strips run parallel to the lengthwise dimension of the card. One strip is made of a high capacity reflective read-only optical memory (ROOM) material. The other strip is a magnetic recording material. The high capacity ROOM strip may be made of a laser recorded material or it may be made of a material that is prerecorded using a photographic process. The two strips store complementary data in database applications.

In U.S. Pat. No. 4,680,460 entitled "System and method for making recordable wallet-size optical card", Drexler discloses a system and method for making a data card involving prerecording information, such as reference position information or servo tracks, on a strip of high resolution, immediate read laser recording material, then adhering the strip to a card such that the strip is recordable in place. A protective transparent laminating material is bonded to the recording surface and then user information is recorded on the strip using a laser aimed at the strip through the laminating material.

In U.S. Pat. No. 4,692,394, entitled "Method of Forming a Personal Information Card", Drexler discloses a personal information is recorded on an information medium containing both visual images, such as a face image or fingerprint, and laser recorded data. The visual images are created on a piece of photographic material or eye readable laser recording material. The visual image material is adhered to a surface of a wallet-size card. A strip of laser recordable optical data storage material is also adhered to the card. After the strip is put on the card, a laser records personal information indicia on the strip in situ. The strip may be a reflective material of silver particles in a gelatin matrix, in which recording produces spots having a detectable difference in reflectivity. The card may be coated with a transparent protective laminate material.

In additional patents, e.g., U.S. Pat. Nos. 6,199,761, 4,863,819, 4,542,288, 4,810,868 disclosed further designs and configurations for storing data on data cards. However, these data cards are still limited by the optical recording technology capacities and the complex process to form the data strips to the data cards.

The Applicants of this Application had submitted prior Patent Applications and disclosed inventions related to the data read/write systems and data storage medium. The previously disclosed inventions are issued into U.S. Pat. Nos. 6,502,755 and 6,311,893. The disclosures made in those Patents are hereby incorporated by Reference in this Patent Application.

Another technical difficulty is the thickness standard as that required for a typical credit card or identification cards provided with magnetic strips or Smart card chip. In order to be compatible with such thickness standards, any data storage tracks for storing additional data using a standard credit card or identification card must comply with such thickness standards. Compatibility with the thickness standards is mandatory such that the added data tracks can be conveniently implemented without affecting the operation of the magnetic strips or Smart card chip with existing platforms implemented with magnetic strip card or Smart card readers available in almost every store connected to the networks and databases to perform identification and credit checks.

Therefore, a need still exists to provide an improved data access device and data-card storage configuration that is compatible with the credit card thickness standard to process and store data in such that more data can be available for card user authentication applications to overcome the above-mentioned difficulties and limitations.

SUMMARY OF THE PRESENT INVENTION

Therefore, an object of this invention is to provide a data access device and an optical memory strip that can adhere to a data card complying with thickness standard of credit cards to store data both in a magnetic strip and/or semiconductor chip such as Smart-card chip and also in this optical memory strip. The magnetic data strips may be identical to a conventional magnetic strip stored data now commonly processed by the remote data processing center as now implemented in the credit card or ID card industries. Additional data such as user's biometrics data, or other information could be stored in the optically accessible data strip. These additional data may be processed locally by employing a card reader as described in U.S. Pat. No. 6,311,893 or an enhanced and modified Compact Disk (CD) reader or DVD reader. This invented optical memory strip can be attached to any card platform in coexistence with original card platform to overcome the difficulties and limitation encountered in the prior art.

Specifically, this invention discloses a data access device and recording media operated with data track configuration by employing a group of linear data tracks and/or strips and a plurality of data arc segments or circular data tracks and optionally a semiconductor memory chip such as a Smart-card chip. The linear data strips are compatible and operable with conventional credit card or ID card readers while the data arc segments or circular data tracks contain additional authentication information for identifying a true owner of a credit card or ID card to prevent credit card fraud or identification theft. Specific processing steps and layer structure are provided to manufacture the data arc segments of circular data tracks such that the thickness of the data card is compatible with the thickness standard of the credit cards.

Briefly, in a preferred embodiment, the present invention discloses a data storage card that includes at least an optical data track for storing data accessible with an optical data accessing means wherein the optical data track is supported on an optical memory strip (OMS) as a cutoff piece attached to the data-storage card. The data storage card further has at least a magnetic data track for storing data accessible with a magnetic data accessing means and optionally a semiconductor chip for storing data accessible with a semiconductor data accessing means. The optical data tracks may have different configurations such as a plurality of circular arc segments, a plurality of arc segments formed as spiral segments having a fixed center rotating with continuously varying radius. The optical data track may be a plurality of arc segments formed as spiral segments having a moving center rotating with continuously varying radius. The optical data track may be a plurality of arc segments formed as circle segments having a fixed center of concentric circles. The optical data track may be a plurality of arc segments formed as circle segments having a moving center rotating with a constant radius. The optical data track may be two arc segments of different lengths. The optical data track may be a circular, spiral arc segment, or a linear data-track segment. The optical memory strip may further include a recording layer for containing the data track wherein the recording layer has a smaller area than the OMS as a cutoff piece. The OMS further includes a protective layer as a bottom layer. The protective layer has a trench for disposing a recording layer therein. Alternately, the additional layers, e.g., a reflective layer, a dye layer, a dielectric layer, a metal phase-change (PC) layer, etc., may be formed in the trench of the protective layer. A focusing layer is formed on top of the protective layer to cover and seal the recording layer and other layers in the trench. Such configuration insure that the recording layer would not peel off and greatly improve the reliability of the data stored in the data tracks disposed on the recording layer.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 1A to 1D are top views for showing the data storage card of this invention where the data tracks can be configured as linear data strips and also in arc-segments and as circular data track of different shapes, sizes, facing different directions; and distributed on one side or both sides of the data strips.

FIGS. 1E-1 to 1M-6 are top views for showing the data storage data tracks can be configured as different kinds of curved arc-segments of different shapes, sizes, facing different directions disposed on a data card in combination with linear data strips.

FIG. 2 is a data card provided with a magnetic strip compatible with conventional credit card verification system and an embedded data storage strip provided plurality of data arc segments of this invention.

DETAILED DESCRIPTION OF THE PREFERRED EMBODIMENT

Figure 2:
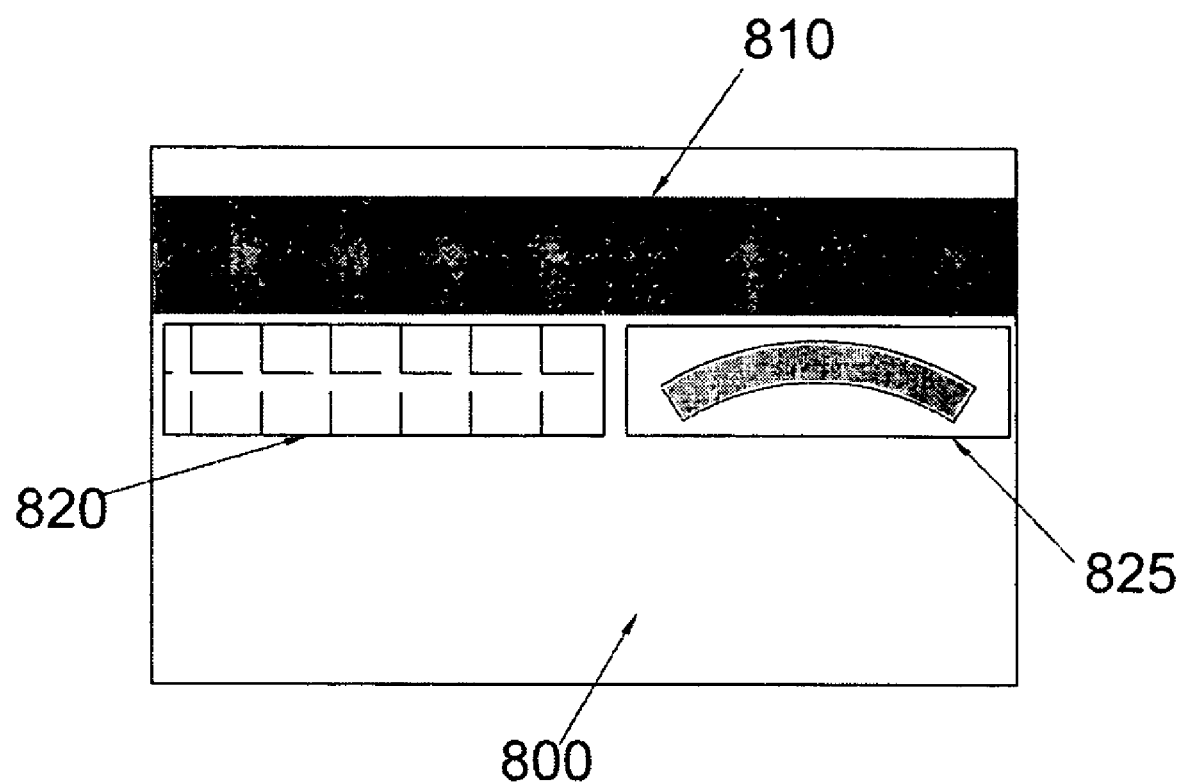

FIG. 1A to 1C are top views of show a data storage card 700 formed with data storage tracks configured both as linear data strips 710 and data arc segments 720. Specifically, the linear data strips 710 in FIGS. 1A to 1D are compatible and can be written and read by conventional credit card or ID card writing and reading devices. In the meantime the data stored in the data arc segments 720 or circular data tracks, are accessed by the card-accessing device disclosed in this invention. The dotted lines 730 show the rotational trajectories of the pickup head for reading or writing data on the data card. In a preferred embodiment, the data strips 710 and the data arc segments or the circular data tracks can be a magnetic or optical data tracks and operable with either or both a magnetic or optical data accessing device respectively. In other preferred embodiments, the linear data track may be a magnetic strip accessible by conventional magnetic data strip writing and reading devices and the arc data segments or circular data tracks can be optical data tracks operable with optical data access devices.

In FIG. 1A, the optical pickup head read and/or write data on the data card 700 covers only the area of the data arc segments 720 and does not extend to the areas disposed with linear data strips 710. The linear data strips 710 are written or read by conventional data card devices, e.g., a credit card reader. In FIG. 1B, the optical pickup head as shown by the dotted curved-line 730 also covers the linear data strips 710. Even the pickup head sweeps across the linear region, controller is provided with an option to ensure that the data in the linear track region is protected as needed In FIG. 1C, the linear data strips 710 are disposed in the middle of the data card 700 and the data arc segments 720 are disposed on both sides of the linear data strips 710. Again, an optical pickup head as described above is applicable to access data on OMS data storage tracks.

FIGS. 1E-1 to 1E-4 and 1I-1 to 1I-3 shows the track of an optical pickup head to form circular arc segments with fixed radius and moving centers. Based on this kind of tracks, different kinds of data arc-segments can be formed on a data card for storing data therein as that shown in FIGS. 1E-5 to 1E-20 and 1I-4 to 1I-6. FIGS. 1F-1 to 1F-4 and 1J-1 to 1J-3 shows the data arc-segments formed with a spiral track with continuously varying radius and a fixed or moving center. Based on this kind of spiral tracks, different kinds of data arc-segments can be formed on a data card for storing data therein as that shown in FIGS. 1F-5 to 1F-20 and 1J-4 to 1J-6. FIGS. 1K-1 to 1K-4 and 1M-1 to 1M-3 shows the data arc-segments formed with a concentric circle track with varying radius and a fixed or moving center. Based on this kind of concentric circle track, different kinds of data arc-segments can be formed on a data card for storing data therein as that shown in FIGS. 1K-5 to 1K-20 and 1M-4 to 1M-6. FIGS. 1G-1 to 1G-4 and 1I1 to 1I3 shows the formation of the data arc-segments with a "moving center rotating with constant radius" configuration to form the data arc-segments as that shown in FIGS. 1G-5 to 1G-8 and 1I-4 to 1I-6. FIGS. 1G-9 to 1G-14 show the data cards with linear data stripes disposed with data arc-segments formed by applying the methods shown in FIGS. 1G-1 to 1G-8 and 1I-1 to 1I-6. FIGS. 1H-1 to 1H-4 and 1J-1 to 1J-3 shows the formation of the data arc-segments with a spiral motion using a configuration of "Fixed or Moving center rotating with continuously varied radius" to form the data arc-segments as that shown in FIGS. 1H-5 to 1H-8 and 1J-4 to 1J-6. FIGS. 1H-9 to 1H-14 show the data cards with linear data stripes disposed with data arc-segments formed by applying the methods shown in FIGS. 1H-1 to 1H-8 and 1J-1 to 1J-6. FIGS. 1L-1 to 1L-4 and 1M-1 to 1M-3 shows the formation of the data arc-segments with a concentric circle motion using a configuration of "Fixed or Moving center rotating with varied radius" to form the data arc-segments as that shown in FIGS. 1L-5 to 1L-8 and 1M-4 to 1M-6. FIGS. 1L-9 to 1L-14 show the data cards with linear data stripes disposed with data arc-segments formed by applying the methods shown in FIGS. 1L-1 to 1L-8 and 1M-1 to 1M-6.

FIG. 2 shows a data card 800 that has substantially a same size as a standard credit card or identification card, e.g. a Driver's License, which can be conveniently carried in a standard wallet. Just like a regular credit card or Driver's License, the data card 800 has a magnetic strip 810 to store credit card or ID information that can be conveniently readout and transmitted by current credit card or debit card verification readers available in many stores, ATM machines, Gas stations, Banks, Membership Club or Driver's License reader carried by a police driving a highway patrol car. The data card 800 further includes a paper strip or a specially coated strip 820 to allow for user signature. An optical memory strip 825 of this invention can be either adhered on the data card or implanted in the card 800. The optical memory strip has a width about 10 millimeters (mm) and length about 35 mm such that the optical memory strip 825 may be conveniently placed in different places on the data card depending on the existing requirements for the credit cards or the ID cards. The size of the optical memory strip 825 may vary depending on the requirement of the storage capacity of the application. The optical memory strip 825 includes data arc segments that may be employed to store cardholder's biometrics information such as picture, fingerprints, etc. The data arc segments may be of different shapes and sizes as that shown in FIGS. 1A to 1M. A preferable embodiment is to form the data arc segments as optical data arc segments for an optical card reader of this invention to read and write the data on the data arc segments.

According to FIG. 2, this invention discloses a data-storage card that includes an optical memory strip 825 having at least one arc-segment wherein each arc-segment constituting a data-storage track. The data card further includes a linear data storage means 810 for storing data therein. In a preferred embodiment, each of the data-storage tracks in the optical memory strip 825 further includes circular arc-segments of fixed radius. In another preferred embodiment, each of the data-storage tracks in the optical memory strip 825 further includes a spiral arc-segment of varying radius. In another preferred embodiment, each of the data-storage tracks in the optical memory strip 825 further includes a concentric circle arc-segment of varying radius. In another preferred embodiment, each of the data-storage tracks in the optical memory strip 825 further includes semicircular arc-segments.

Figure 3A:
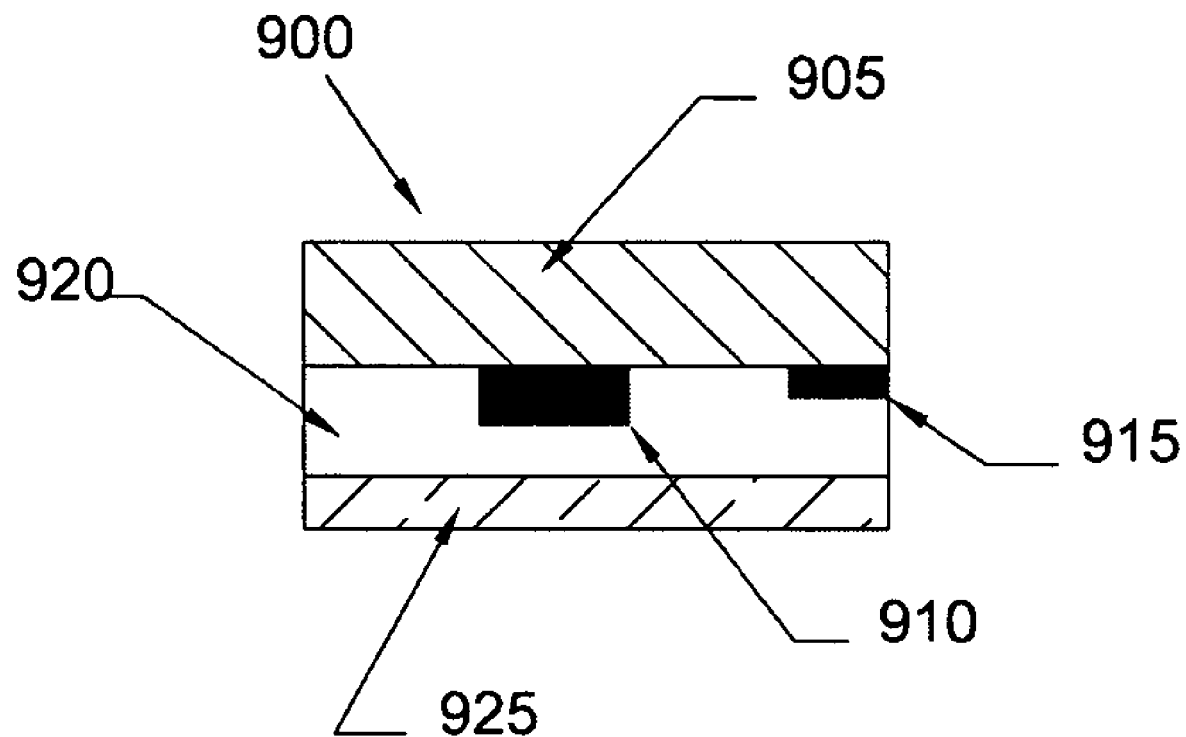
FIGS. 3A, 3E, 3F AND 3G are a cross sectional view of a layer structure of an optical memory strip (OMS) of this invention.
Figure 3B:
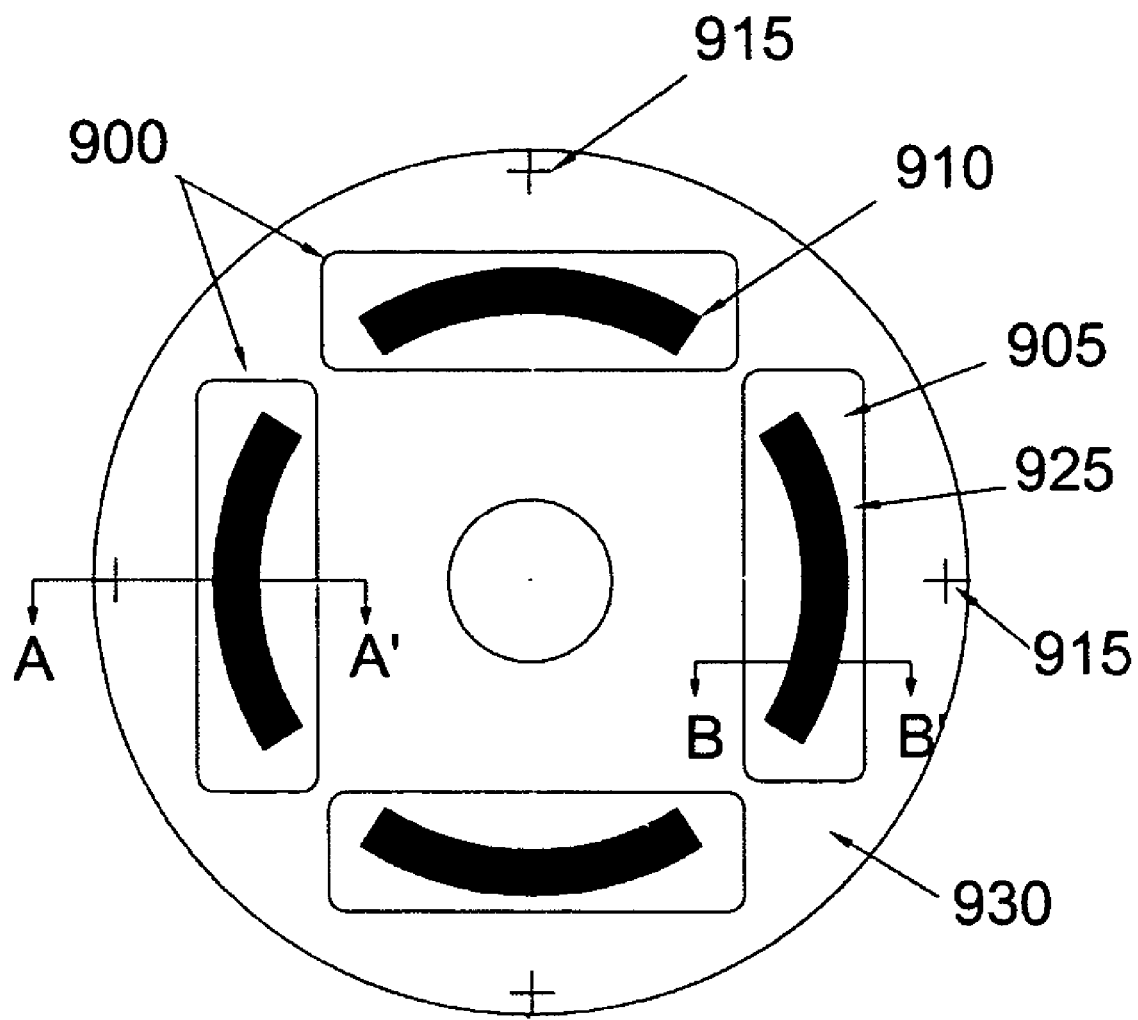
FIGS. 3B and 3C are to top views of two alternate substrates to form the OMS of FIG. 3A thereon.
Figure 3C:
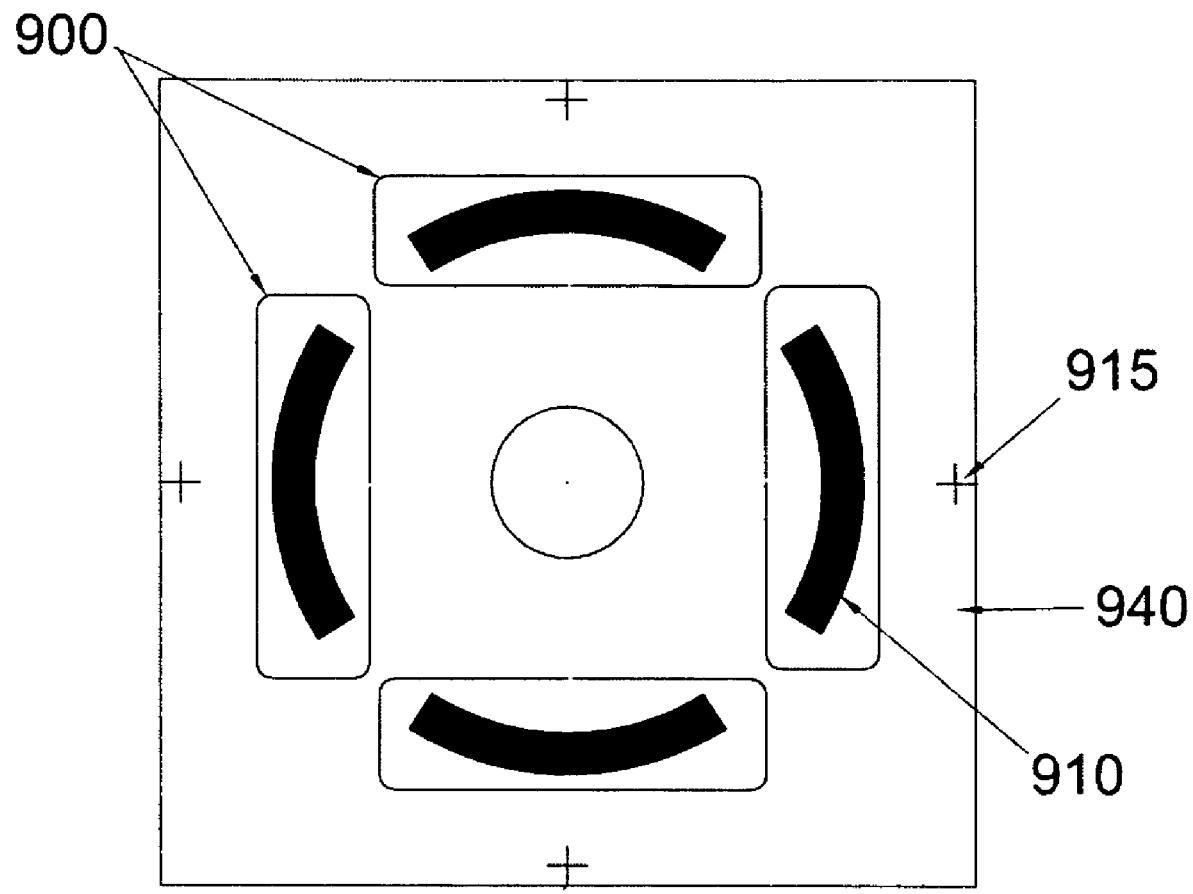
Figure 3D:
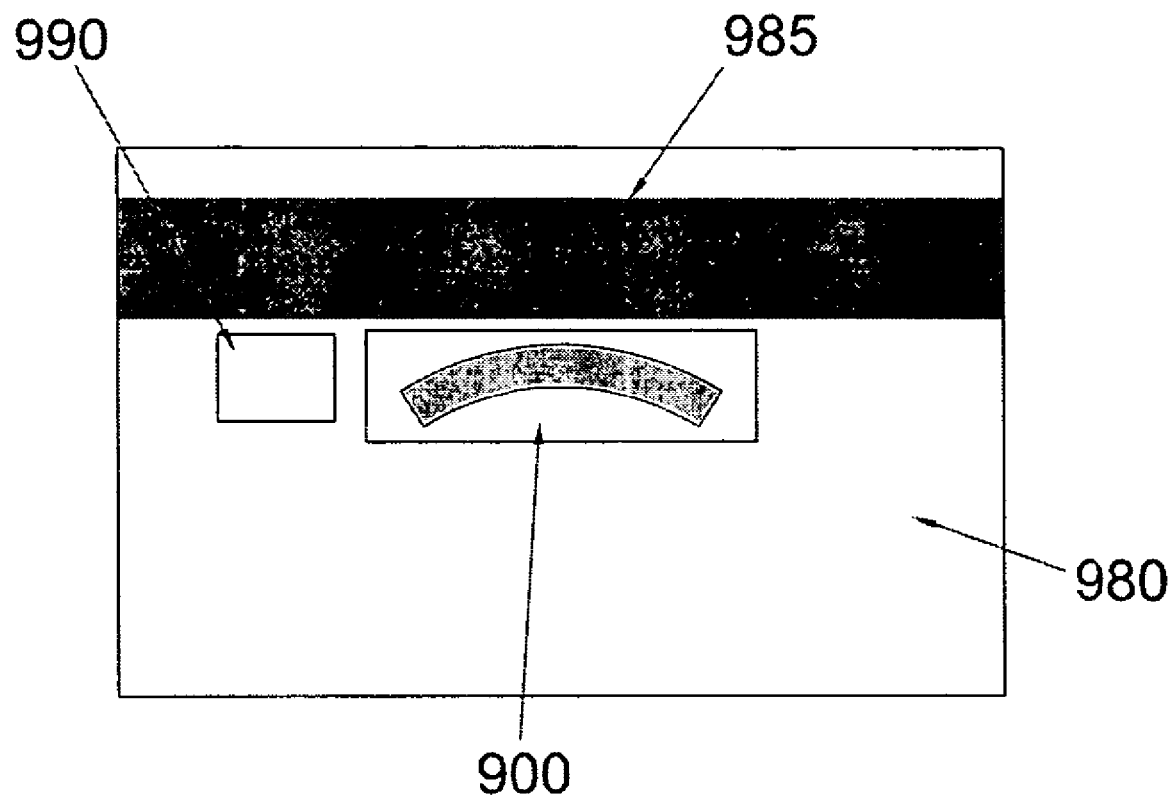
FIG. 3D is an actual credit card configuration implemented with the optical memory strip, the magnetic memory strip and a semiconductor data storage chip.

Referring to FIGS. 3A and 3B for a side view of the layers for forming the optical memory strips (OMS). The OMS 900 as shown in FIG. 3A is a cross sectional view across line A–A' of FIG. 3B that includes five layers formed by a spin process. A top layer 905 is a focusing layer composed of a substrate material that can be glass, polycarbonate or other laser beam transparent materials to project a laser beam there through for accessing data stored in a recording layer 910. Underneath the focusing layer is a recording layer 910 and a tooling mark layer 915 supported on a protective layer 920 made of lacquer type of materials. The recoding layer 910 is composed of laser sensitive material for storing data therein. At the bottom of the protective layer 920 is a bonding layer 925 that can be heat-activated film for bonding the OMS onto a data card, i.e., a credit card or ID card. As shown in FIG. 3B, the OMS 900 is formed on a focusing layer 930 with the tooling mark 915. FIGS. 3C shows another focusing layer 940 that has a square shape to form the OMS 900, and the focusing layer 930 or 940 can be of different shapes and sizes to optimally making use of the manufacturing equipment, tooling and process available. As shown in these drawings, the area occupied by the recording layer 910 is relatively small to allow large bonding area to securely attach the focusing layer to the protective layer. The tooling mark layer 915 is provided to carry out an operation to stamp the optical memory strip at a precise location relative to the optical data tracks on the recording layer. The bonding layer 925 is heat activated to bond the OMS to the credit card. After the optical memory strip (OMS) is bonded to the credit card or ID has a thickness less than 0.76 millimeters to compatibly implemented the OMS with the regular credit cards or ID cards. FIG. 3D shows a data card 980 of this invention that includes a magnetic strip 985, an optical memory strip (OMS) 900 and a smart card chip 990 wherein the OMS can store larger amount of biometrics data including facial image and thumb prints for preventing identification fraud.

Figure 3E:
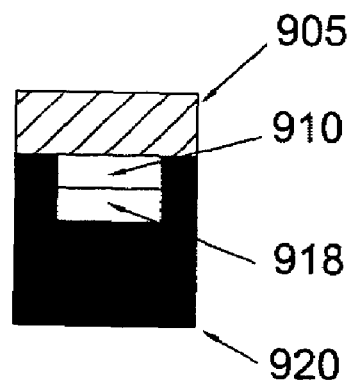
Figure 3F:
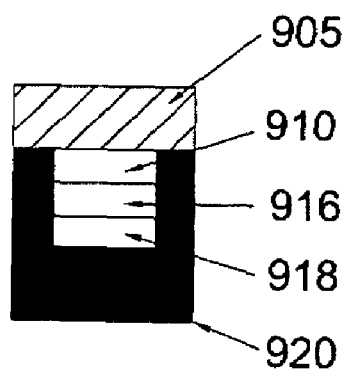
Figure 3G:
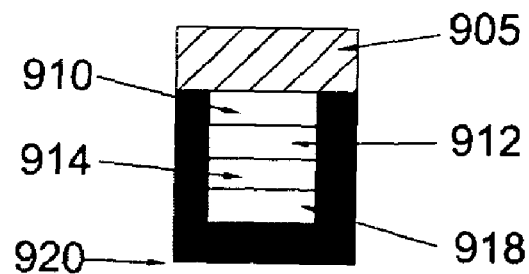

FIGS. 3E to 3G are side cross sectional views of the OMS 900 across a line B–B' of FIG. 3B. FIG. 3E shows a layer structure of a CDROM or DVDROM strip with the recording layer 910 covered by a focus layer 905 on the top and supported by a reflective layer 918. The recording layer 910 and the reflective layer 918 have a smaller area than the protective layer 920 and are surrounded by the protective layer 920. FIG. 3F shows a layer structure of a CDR or DVDR strip with the recording layer 910 covered by a focus layer 905 on the top and supported by a dye layer 916 and a reflective layer 918. The recording layer 910, the dye layer 916 and the reflective layer 918 have a smaller area than the protective layer 920 and are surrounded by the protective layer 920. FIG. 3G shows a layer structure of a CDRW or DVDRW strip with the recording layer 910 covered by a focus layer 905 on the top and supported by a dielectric layer 912, a metal phase change layer 914 and a reflective layer 918. The recording layer 910, the dielectric layer 912, the metal phase change layer 914 and the reflective layer 918 have a smaller area than the protective layer 920 and are surrounded by the protective layer 920.

Figure 4A:
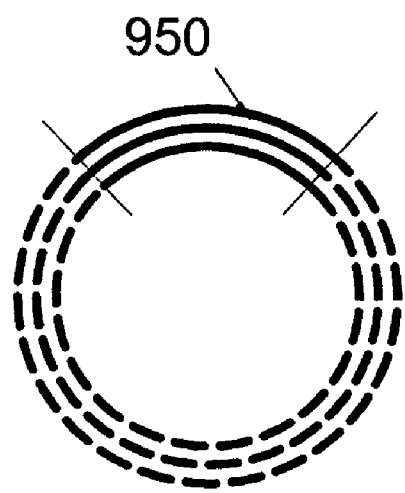
FIGS. 4A to 4C show the different configurations for forming the data tracks to implement in the optical memory strips of FIGS. 3A to 3G.
Figure 4B:
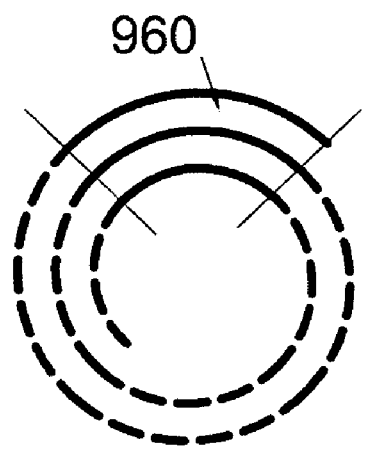
Figure 4C:

FIGS. 4A to 4C show the different configurations for making the data tracks on the recording layer. As shown in these figures, the data tracks 950 can be arc segments as a portion of concentric circles, e.g., FIG. 4A, or arc segments of spiral tracks 960, e.g., FIG. 4B, or straight lines 970, e.g., FIG. 4C.

According to FIG. 3B, this invention discloses a plurality of optical memory strips (OMS) are formed on a donut shape disc 930. In the process of forming the OMS, there is at least one piece of OMS 900 on the donut shape disc 930. Each OMS 900 is formed by using a process of cutting off the OMS piece from the donut shaped disk 930. There are at least four layers in the OMS. The OMS may include different number of layers to apply the OMS for data storage as a CDROM, CDR, CDRW, DVDROM, DVDR and DVDRW strip. The top layer is the focusing layer 905 and bottom layer is the protective layer 920. Those two layers remain the donut shape discs during the manufacturing process. All other layers located in the middle Change to smaller sizes which can be a arc shape, rectangular shape, circle shape or square shape . . . etc. Those smaller size layers sandwiched between the focusing layer 905 and the protective layer 920 during the manufacturing process. The recording layer 910 contains data tracks and these data tracks can be concentric circular arcs, spiral arcs, or straight lines as that shown in FIGS. 4A to 4C. The OMS strips 900 are formed on one donut shape disc and as shown in FIG. 3B each of these OMS strips when formed on the donut shape disc has same shape of data tracks. The focusing layer has at least a mark to function as an OMS cutting tooling mark. This is for the position alignment during the cutting of OMS from donut's shape disc 930. The size and the shape of the OMS 900 are varied depending on the applications. The focusing layer 905 and the protective layer 920 cover the entire top and bottom surfaces of the OMS while the rest of all other layers located in the middle are smaller than the size of the OMS. Such configuration has a special advantage the recording layer 910 is bonded securely between the focusing layer 905 and the protective layer 920. Furthermore, the recording layer 910 is sealed and completed protected by the focusing layer and the protective layer.

Figure 5A:
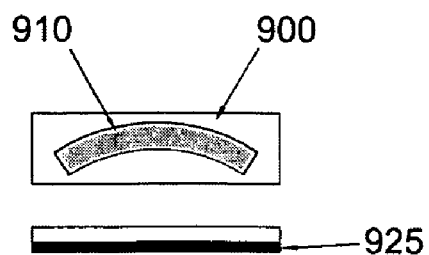
FIG. 5A shows a cutoff piece of the OMS strips.
Figure 5B:
FIG. 5B shows a plastic card with a milled placement area ready to receive the cutoff OMS piece into the placement area.
Figure 5C:
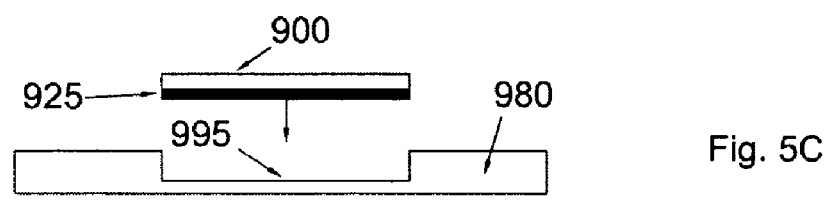
FIGS. 5C and 5D are cross sectional views for showing the OMS strip implanted into the plastic card.

The OMS strips are then cut off from the disk 930. FIG. 5A shows a cutoff piece of the OMS strips 900 and FIG. 5B shows a plastic card with a milled placement area 995 ready to receive the cutoff OMS piece into the placement area 995. FIG. 5C is a cross sectional view for showing the OMS strip implanted into the plastic card 980. As FIG. 5B shows that the card is first milled to form the OMS placement area 995 that is slightly larger than the size of the OMS such that the OMS 900 can be conveniently placed onto the milled placement area 995. The depth of the milled placement area 995 is also slightly larger than the thickness of the OMS 900 such that after the OMS 900 is implanted onto the placement area 995, the top surface is slightly lower than the top surface of the plastic card 980 shown in FIG. 5D. As that shown in FIG. 3D, the plastic card 980 may also include a magnetic strip 985 and/or a Smart Card chip 990. The plastic card 980 may also be a card of different sizes and different shapes.

Figure 5D:
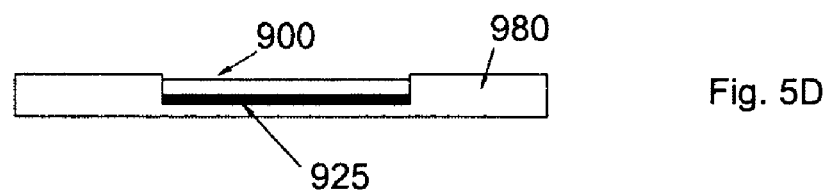

For the purpose of securely attaching the OMS 900 onto the plastic card 980, there is a heat activated film (HAF) layer 925 bonded to the protective layer 920 as that shown in FIG. 3A. To bond OMS 900 to the plastic card 980, the HAF layer 925 or the placement area 995 or both should be preheated. When applying the heat to the HAF layer 925, the heat is applied to the top of the focusing layer 905 and going through protective layer 925. Also, since the heat may damage the focusing layer of the top of the recording layer and the data tracks formed in the recording layer, heating of the area of the recording layer 910 must be avoided. In the preheating process, special care should be taken to apply the heat only to the areas not overlapping with the recording layer 910. Alternatively, the OMS 900 may also be welded to the plastic card 980. Again, when applying heat to the focusing layer on the top or the protective layer on the bottom, the heat should not applied to the areas overlapped with the recording layer 910 to assure no heating damage has occurred to the recording layer 910 in the preheating and OMS implanting processes. As shown in FIG. 5D, the thickness of OMS is equal to or slightly less than the plastic card. After OMS be implanted in plastic card, the top surface of the implanted OMS is the same or slight lower than the top surface of the plastic card.

For decorative or commercial purpose, the focusing layer 905 can be dyed to provide a visual effect of different colors as it may be desirable for customer's identification as long as the dyed color in the focusing layer does not interrupts the laser beam's performance. Alternately, the protective layer can also be dyed to show different colors for customer's identification. In a different embodiment, the heat-activated film (HAF) 925 for attaching the OMS 900 to the plastic card 980 can be dyed to have different colors. Additionally, each of these three layers may also have different colors to present a special combination colors to create a special effect for particular customer requirements when necessary.

Figure 6A:
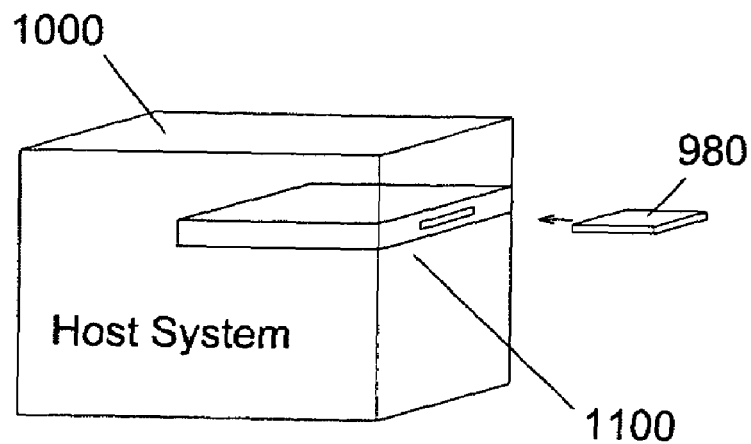
FIG. 6A shows a configuration of a system that a host system that include a OMS device to adaptively receive the plastic card to read data from the OMS or write data to the OMS.
Figure 6B:
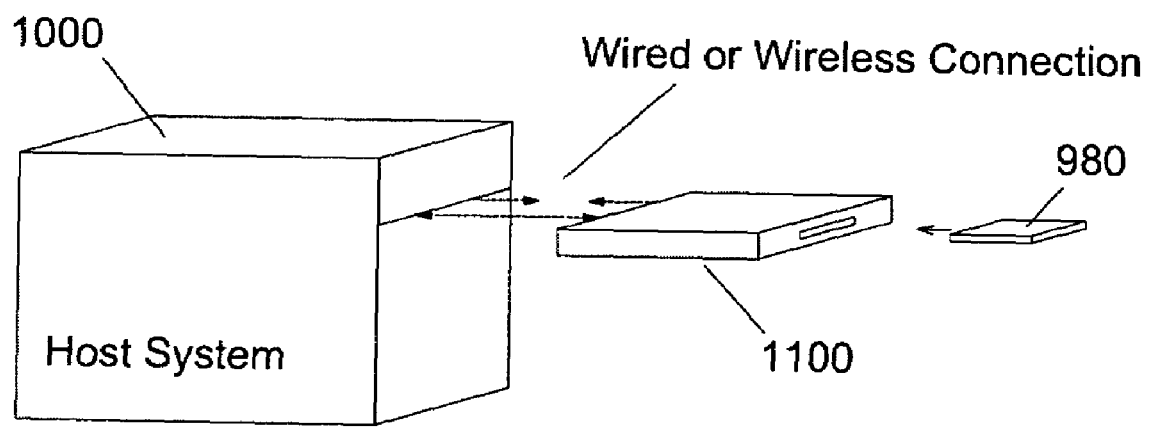
FIG. 6B shows another configuration with a separate OMS drive device as a separate data read/write device and the separate OMS drive device is connected to another host system by wire or wireless connection.

FIG. 6A shows a configuration of a system that a host system 1000 that include a OMS device to adaptively receive the plastic card 980 to read data from the OMS or write data to the OMS. This host system 1000 may be a personal computer (PC), an Internet device, or a server, or different types of host system. FIG. 6B shows another configuration with a separate OMS drive device as a separate data read/write device 1100 and the separate OMS drive device 1100 is connected to another host system 1000 by wire or wireless connection. The OMS device 1100 communicates with the host system 1000, e.g., a PC, an Internet device, a server, a personal digital assistant, etc. The OMS drive device 1100 may be provided with multiple read/write functions for reading/writing data on OMS 900, the magnetic strip 985 and/or the smart card chip 990. The OMS drive device 1100 may also be provided with processor to process image data or execute personal identification programs to carry out special designated functions as required by different applications.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A data-storage card comprising:
  at least an optical data track for storing data accessible with an optical data accessing means wherein said optical data track is supported on an optical memory strip (OMS) as a cutoff piece attached to said data-storage card; and
  said optical data track further having a plurality of arc segments comprising cutoff circumferential segments of multiple substantially circular curves wherein said cutoff piece has a width shorter than diameters of said substantially circular curves, wherein the multiple substantially circular curves correspond to curves of a spiral that has a continuously outwardly varying radius and a non-fixed center as the spiral expands outwards, such that the arc segments correspond to different centers and different radii of the spiral.

2. The data-storage card of claim 1 further comprising:
  at least a magnetic data track for storing data accessible with a magnetic data accessing means.

3. The data-storage card of claim 1 further comprising:
  a semiconductor chip for storing data accessible with a semiconductor data accessing means.

4. The data-storage card of claim 1 wherein:
  said arc segments further having a plurality of cutoff circular arc segments cutting off from a plurality of circles.

5. The data-storage card of claim 1 wherein:
  said optical data track further having a plurality of arc segments formed as cutoff spiral segments from a spiral formed with a fixed center rotating with continuously varying radius.

6. The data-storage card of claim 1 wherein:
  said optical data track further having a plurality of arc segments formed as cutoff circle segments from concentric circles having a fixed center.

7. A data-storage system comprising:
  an optical data pickup head for accessing data stored in an optical data track supported on an optical memory strip (OMS) as a cutoff piece attached to a data-storage card; and
  said optical data track further having a plurality of arc segments formed as cutoff circumferential segments from multiple substantially circular curves wherein said cutoff piece having a width shorter than diameters of said substantially circular curves wherein the multiple substantially circular curves correspond to curves of a spiral that has a continuously outwardly varying radius and a non-fixed center as the spiral expands outwards, such that the arc segments correspond to different centers and different radii of the spiral.

8. The data-storage card of claim 1 wherein:
  said optical data track further having at least two arc segments of different lengths.

9. The data-storage card of claim 1 wherein:
  said optical data track further having a circular arc segment.

10. The data-storage card of claim 1 wherein:
  said optical data track further having a spiral arc segment.

11. The data-storage card of claim 1 wherein:
  said OMS further including a recording layer for disposing said data track wherein said recording layer having an area smaller than said OMS as said cutoff piece.

12. The data-storage card of claim 1 wherein:
  said OMS further having a protective layer with a trench for disposing a recording layer therein for containing said optical data track.

13. The data-storage card of claim 1 wherein:
  said OMS further having a protective layer with a trench for disposing a recording layer therein for containing said optical data track, and said OMS further having a reflective layer disposed below said recording layer in said trench.

14. The data-storage card of claim 13 wherein:
  said OMS further having a dye layer disposing in said trench below said recording layer.

15. The data-storage card of claim 13 wherein:
  said OMS further having a dielectric layer disposing in said trench.

16. The data-storage card of claim 13 wherein:
  said OMS further having a metal phase-change (PC) layer disposing in said trench.

17. The data-storage card of claim 1 wherein:
  said OMS further having a protective layer with a trench for disposing a recording layer therein for containing said optical data track; and
  said OMS further includes a focusing layer covering said protective layer and sealing said recording layer in said trench.

18. The data-storage card of claim 13 wherein:
  said OMS further includes a focusing layer covering said protective layer and sealing said recording layer and said reflective layer in said trench.

19. The data-storage card of claim 14 wherein:
  said OMS further includes a focusing layer covering said protective layer and sealing said recording layer, said dye layer and said reflective layer in said trench.

20. The data-storage card of claim 15 wherein:
said OMS further includes a focusing layer covering said protective layer and sealing said recording layer, said reflective layer and said dielectric layer in said trench.

21. The data-storage card of claim 16 wherein:
said OMS further includes a focusing layer covering said protective layer and sealing said recording layer, said reflective layer and said metal phase-change (PC) layer in said trench.

22. The data-storage card of claim 1 wherein:
said OMS further having a protective layer with a trench for disposing a recording layer therein for containing said optical data track, and said OMS further having a heat activate bonding layer disposed below said protective layer.

23. A data-storage system comprising:
an optical data pickup head for accessing data stored in an optical data track supported on an optical memory strip (OMS) as a cutoff piece attached to a data-storage card;
said optical data track further having a plurality of arc segments formed as cutoff circumferential segments from multiple substantially circular curves wherein said cutoff piece having a width shorter than diameters of said substantially circular curves;
said OMS further having a protective layer with a trench for disposing a recording layer therein for containing said optical data track; and
said OMS further having a heat-activated bonding layer disposed below said protective layer for bonding and attaching to said data storage card wherein said bonding of said OMS as said cutoff piece to said data storage card is between said heat-activated bonding layer activated by applying heat, in a non-overlapping manner with respect to said recording layer, to said OMS wherein the multiple substantially circular curves correspond to curves of a spiral that has a continuously outwardly varying radius and a non-fixed center as the spiral expands outwards, such that the arc segments correspond to different centers and different radii of the spiral.

24. The data-storage system of claim 23 further comprising:
an OMS placement area having a lower surface profile having an area slightly larger than said OMS for placing and attaching said OMS as a cutoff piece to said data-storage card.

25. The data-storage system of claim 23 further comprising:
an OMS placement area having a lower surface profile having an area slightly larger than said OMS for placing and attaching said OMS as a cutoff piece to said data-storage card whereby a top surface of said OMS is substantially at a same height as a top surface of said data-storage card.

26. The data-storage system of claim 24 wherein:
said OMS further having a bonding layer disposed as a bottom layer of said OMS for bonding to said OMS placement area to securely attach said OMS as a cutoff piece to said data-storage card.

27. The data-storage system of claim 26 wherein:
said bonding layer disposed as a bottom layer of said OMS is a heat-activated bonding layer for bonding to said OMS placement area by applying a heat to said OMS in a non-overlapping manner with respect to said recording layer disposed on said OMS whereby said recording layer is not applied with said heat.

28. A data storage card comprising an optical memory strip (OMS) constituting a cutoff piece comprising:
the data storage card comprising at least an optical data track useful for storing data accessible with an optical data accessing means; and
said optical data track further having a plurality of arc segments formed as cutoff circumferential segments from multiple substantially circular curves wherein said cutoff piece having a width shorter than diameters of said substantially circular curves wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card.

29. The data storage card of claim 28 wherein:
said optical data track further having a plurality of circular arc segments.

30. The data storage card of claim 28 wherein:
said optical data track further having a plurality of arc segments formed as cutoff spiral segments cutting off from a spiral formed with a fixed center rotating with continuously varying radius.

31. The data storage card of claim 28 wherein:
said optical data track further having a plurality of arc segments formed as spiral segments having a moving center rotating with continuously varying radius.

32. The data storage card of claim 28 wherein:
said optical data track further having at least two arc segments of different lengths.

33. The data storage card of claim 28 wherein:
said optical data track further having a circular arc segment.

34. The data storage card of claim 28 wherein:
said optical data track further having a spiral arc segment.

35. The data storage card of claim 28 wherein:
said optical data track further having a plurality of arc segments formed as cutoff spiral segments cutting off from a spiral with a moving center rotating with continuously varying radius.

36. The data storage card of claim 28 further comprising:
a recording layer for disposing said data track wherein said recording layer having an area smaller than said OMS as said cutoff piece.

37. The data storage card of claim 28 further comprising:
a protective layer with a trench for disposing a recording layer therein for containing said optical data track.

38. The data storage card of claim 28 further comprising:
a protective layer with a trench for disposing a recording layer therein for containing said optical data track, and said OMS further having a reflective layer disposed below said recording layer in said trench.

39. The data storage card of claim 38 further comprising:
a dye layer disposing in said trench below said recording layer.

40. The data storage card of claim 38 further comprising:
a dielectric layer disposing in said trench.

41. The data storage card of claim 38 further comprising:
a metal phase-change (PC) layer disposing in said trench.

42. The data storage card of claim 28 further comprising:
a protective layer with a trench for disposing a recording layer therein for containing said optical data track; and
a focusing layer covering said protective layer and sealing said recording layer in said trench.

43. The data storage card of claim 38 further comprising:
a focusing layer covering said protective layer and sealing said recording layer and said reflective layer in said trench.

44. The data storage card of claim 39 further comprising:
a focusing layer covering said protective layer and sealing said recording layer, said dye layer and said reflective layer in said trench.

45. The data storage card of claim 38 further comprising:
a focusing layer covering said protective layer and sealing said recording layer, said reflective layer and said dielectric layer in said trench.

46. The data storage card of claim 41 further comprising:
a focusing layer covering said protective layer and sealing said recording layer, said reflective layer and said metal phase-change (PC) layer in said trench.

47. The data storage card of claim 28 further comprising:
a heat activate bonding layer disposed below said protective layer.

48. The data storage card of claim 28 further comprising:
a protective layer with a trench for disposing a recording layer therein for containing said optical data track; and
a layer disposed below said protective layer for bonding and attaching to a data storage card as a cutoff piece.

49. A data storage card comprising an optical memory strip (OMS) constituting a cutoff piece comprising:
the data storage card comprising at least an optical data track useful for storing data accessible with an optical data accessing means wherein said optical data track further having a plurality of arc segments formed as cutoff circumferential segments from multiple substantially circular curves wherein said cutoff piece having a width shorter than diameters of said substantially circular curves;
a protective layer with a trench for disposing a recording layer therein for containing said optical data track;
a layer disposed below said protective layer for bonding and attaching to a data storage card as a cutoff piece; and
said bonding layer is a heat-activated layer wherein said OMS as said cutoff piece is bonded to said data storage card with a heat applying to said OMS in a non-overlapping manner with respect to said recording layer wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card.

50. The data storage card of claim 28 wherein:
said optical data track further having a plurality of arc segments formed as cutoff circle segments cutting off from multiple concentric circles having a fixed center.

51. A data storage card comprising an optical memory strip (OMS) constituting a cutoff piece comprising:
the data storage card comprising at least an optical data track useful for storing data accessible with an optical data pickup head; and
said optical data track further having a plurality of arc segments formed as cutoff circumferential segments from multiple substantially circular curves wherein said cutoff piece having a width shorter than diameters of said substantially circular curves wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card.

52. A method to form an optical memory strip (OMS) as a cutoff piece attached to a data storage card comprising:
forming said OMS on a disc with at least an optical data track for storing data accessible with an optical data accessing means; and
forming said optical data track as a plurality of cutoff circumferential segments from multiple substantially circular curves wherein said cutoff piece having a width shorter than diameters of said substantially circular curves wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card.

53. The method of claim 52 wherein:
said step of forming said optical data track further including a step of forming a plurality of circular arc segments.

54. The method of claim 52 wherein:
said step of forming said optical data track further including a step of forming a plurality of arc segments as cutoff spiral segments by cutting from a spiral with a fixed center rotating with continuously varying radius.

55. The method of claim 52 wherein:
said step of forming said optical data track further including a step of forming a plurality of arc segments formed as spiral segments having a moving center rotating with continuously varying radius.

56. The method of claim 52 wherein:
said step of forming said optical data track further including a step of forming at least two arc segments of different lengths.

57. The method of claim 52 wherein:
said step of forming said optical data track further including a step of forming a circular arc segment.

58. The method of claim 52 wherein:
said step of forming said optical data track further including a step of forming a spiral arc segment.

59. The method of claim 52 wherein:
said step of forming said optical data track further including a step of forming a recording layer having an area smaller than said OMS for disposing said data track.

60. The method of claim 59 wherein:
said step of forming said optical data track further including a step of forming protective layer with a trench for disposing said recording layer therein for containing said optical data track.

61. The method of claim 59 wherein:
said step of forming said optical data track further including a step of forming protective layer with a trench for disposing said recording layer therein for containing said optical data track and disposing a reflective layer below said recording layer in said trench.

62. The method of claim 59 wherein:
said step of forming said optical data track further including a step of forming protective layer with a trench for disposing said recording layer therein for containing said optical data track and disposing a dye layer in said trench below said recording layer.

63. The method of claim 60 further comprising:
disposing a dielectric layer in said trench.

64. The method of claim 60 further comprising:
disposing a metal phase-change (PC) layer in said trench.

65. The method of claim 59 wherein:
said step of forming said optical data track further including a step of forming a protective layer with a trench for disposing said recording layer therein for containing said optical data track; and
the method further includes a step of disposing a focusing layer for covering said protective layer and sealing said recording layer in said trench.

66. The method of claim 60 further comprising:
disposing a focusing layer covering said protective layer and sealing said recording layer and said reflective layer in said trench.

67. The method of claim 61 further comprising:
disposing a focusing layer covering said protective layer and sealing said recording layer, said dye layer and said reflective layer in said trench.

68. The method of claim 62 further comprising:
disposing a focusing layer covering said protective layer and sealing said recording layer, said reflective layer and said dielectric layer in said trench.

69. The method of claim 63 further comprising:
disposing a focusing layer covering said protective layer and sealing said recording layer, said reflective layer and said metal phase-change (PC) layer in said trench.

70. A method to form an optical memory strip (OMS) as a cutoff piece attached to a data storage card comprising:
forming said OMS on a disc with at least an optical data track disposed on a recording layer on said OMS for storing data accessible with an optical pickup head;
forming said optical data track as a plurality of cutoff circumferential segments from multiple substantially circular curves wherein said cutoff piece having a width shorter than diameters of said substantially circular curves;
wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card forming a protective layer with a trench for disposing said recording layer therein for containing said optical data track; and
disposing a heat activate bonding layer below said protective layer.

71. The method of claim 52 further comprising:
disposing a protective layer with a trench for disposing a recording layer therein for containing said optical data track;
disposing a bonding layer below said protective layer; and
cutting off said OMS from said disc and bonding and attaching said OMS to a data storage card as a cutoff piece.

72. The method of claim 71 wherein:
said step of disposing said bonding layer is a step of disposing a heat-activated bonding layer.

73. The method of claim 72 wherein:
said step of bonding and attaching said OMS to said data storage card is a step of applying a heat to said OMS on an area not overlapping with a recording layer for containing said data track.

74. The method of claim 52 wherein:
said step of forming said optical data track further including a step of forming a plurality of arc segments formed as circle segments having a fixed center of concentric circles.

75. A method to form an optical memory strip (OMS) as a cutoff piece attached to a data storage card comprising:
forming said OMS on a disc with at least an optical data track for storing data accessible with an optical data accessing means;
forming said optical data track as a plurality of cutoff circumferential segments from multiple substantially circular curves wherein said cutoff piece having a width shorter than diameters of said substantially circular curves; and
wherein the multiple substantially circular curves correspond to curves of a spiral that has a continuously outwardly varying radius and a non-fixed center as the spiral expands outwards, such that the arc segments correspond to different centers and different radii of the spiral, and wherein the OMS is disposed on the data storage card.

* * * * *